United States Patent
Kim et al.

(10) Patent No.: US 10,388,962 B2
(45) Date of Patent: Aug. 20, 2019

(54) LITHIUM ELECTRODE, LITHIUM SECONDARY BATTERY COMPRISING SAME, BATTERY MODULE COMPRISING LITHIUM SECONDARY BATTERY, AND PREPARATION METHOD OF LITHIUM ELECTRODE

(71) Applicant: LG CHEM, LTD., Seoul (KR)

(72) Inventors: Taek Gyoung Kim, Daejeon (KR); Minchul Jang, Daejeon (KR); Doo Kyung Yang, Daejeon (KR); Byoungkuk Son, Daejeon (KR); Changhun Park, Daejeon (KR); Junghun Choi, Daejeon (KR); Myeonghun Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 24 days.

(21) Appl. No.: 15/328,657

(22) PCT Filed: Sep. 2, 2015

(86) PCT No.: PCT/KR2015/009219
§ 371 (c)(1),
(2) Date: Jan. 24, 2017

(87) PCT Pub. No.: WO2016/036121
PCT Pub. Date: Mar. 10, 2016

(65) Prior Publication Data
US 2017/0214053 A1 Jul. 27, 2017

(30) Foreign Application Priority Data
Sep. 5, 2014 (KR) .................. 10-2014-0118493

(51) Int. Cl.
*H01M 4/62* (2006.01)
*H01M 4/131* (2010.01)
(Continued)

(52) U.S. Cl.
CPC ......... *H01M 4/628* (2013.01); *H01M 4/0402* (2013.01); *H01M 4/131* (2013.01);
(Continued)

(58) Field of Classification Search
None
See application file for complete search history.

(56) References Cited

U.S. PATENT DOCUMENTS 5,354,631 A 10/1994 Chaloner-Gill et al.
6,025,094 A 2/2000 Visco et al.
(Continued)

FOREIGN PATENT DOCUMENTS

KR 10-2004-0095848 A 11/2004
KR 10-2007-0096932 A 10/2007
(Continued)

OTHER PUBLICATIONS

International Search Report, issued in PCT/KR2015/009219 (PCT/ISA/210), dated Dec. 7, 2015.
(Continued)

*Primary Examiner* — Wyatt P McConnell
(74) *Attorney, Agent, or Firm* — Birch, Stewart, Kolasch & Birch, LLP

(57) ABSTRACT

The present specification relates to a lithium electrode, a lithium secondary battery including the same, a battery module including the lithium secondary battery, and a method for preparing a lithium electrode.

17 Claims, 3 Drawing Sheets

(51) Int. Cl.
  *H01M 4/134* (2010.01)
  *H01M 4/1391* (2010.01)
  *H01M 4/1395* (2010.01)
  *H01M 4/04* (2006.01)
  *H01M 10/0525* (2010.01)

(52) U.S. Cl.
  CPC ......... *H01M 4/134* (2013.01); *H01M 4/1391* (2013.01); *H01M 4/1395* (2013.01); *H01M 10/0525* (2013.01); *Y02E 60/128* (2013.01)

(56) References Cited

U.S. PATENT DOCUMENTS

| | | | |
|---|---|---|---|
| 2003/0180550 | A1 | 9/2003 | Hara et al. |
| 2007/0224509 | A1 | 9/2007 | Aramata et al. |
| 2008/0069944 | A1 | 3/2008 | Muldoon et al. |
| 2009/0280410 | A1 | 11/2009 | Zaguib et al. |
| 2011/0104366 | A1* | 5/2011 | Muldoon ............ C09D 4/00 427/77 |
| 2014/0080000 | A1 | 3/2014 | Han et al. |
| 2014/0272525 | A1* | 9/2014 | Ryu .................... D04H 3/12 429/142 |

FOREIGN PATENT DOCUMENTS

| | | |
|---|---|---|
| KR | 10-2009-0040442 A | 4/2009 |
| KR | 10-2012-0109661 A | 10/2012 |
| KR | 10-2012-0130709 A | 12/2012 |
| KR | 10-1227664 B1 | 1/2013 |
| WO | WO 2008/036742 A2 | 3/2008 |

OTHER PUBLICATIONS

Korean Office Action for application No. 10-2015-0124179 dated Aug. 31, 2016.
Written Opinion of the International Searching Authority, issued in PCT/KR2015/009219 (PCT/ISA/237), dated Dec. 7, 2015.
European Office Action issued in co-pending European Application No. 15 838 622.7-1108, dated Mar. 20, 2018.

* cited by examiner

[Figure 1]
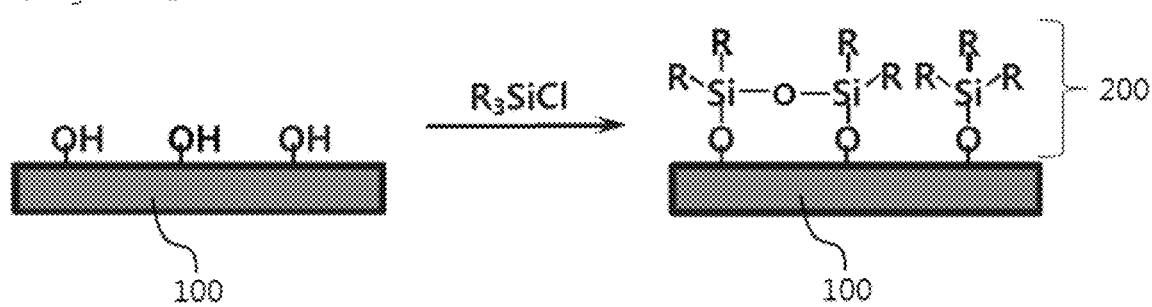
[Figure 2]
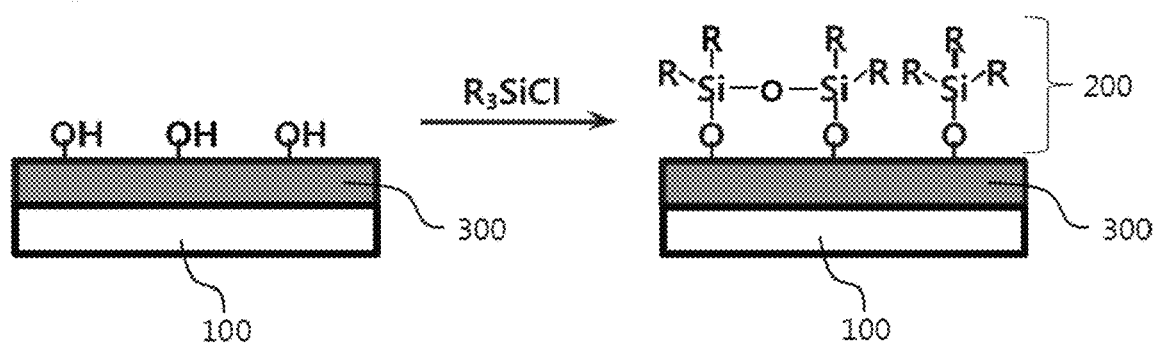
[Figure 3]
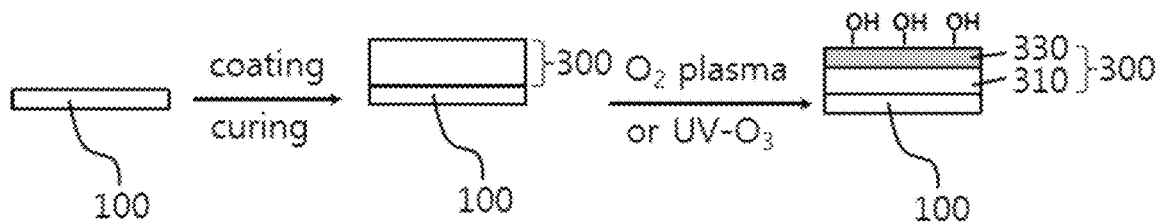

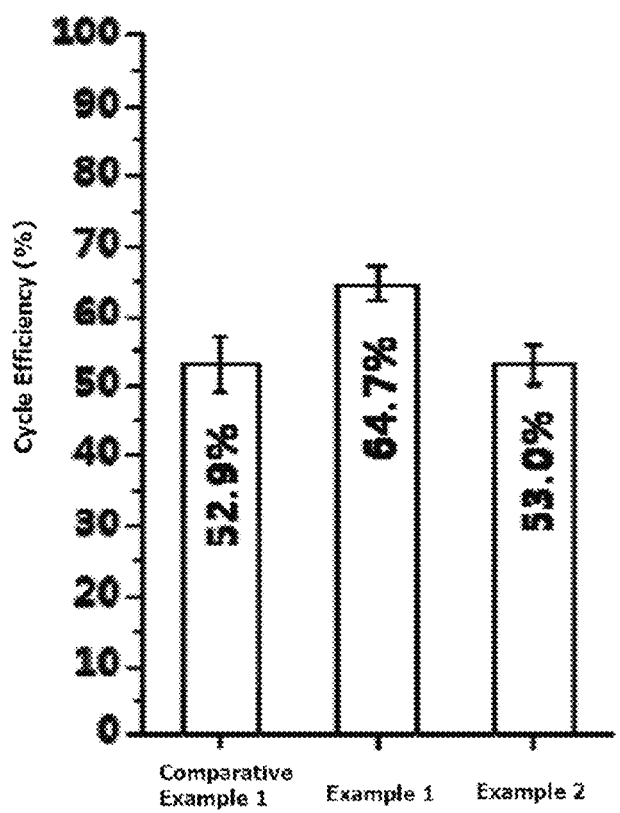

[Figure 5]
| | Comparative Example 1 | Example 1 | Example 2 |
|---|---|---|---|
| IMAGE AFTER EXPOSURE TO AIR (RH 50%) FOR 10 MINUTES | 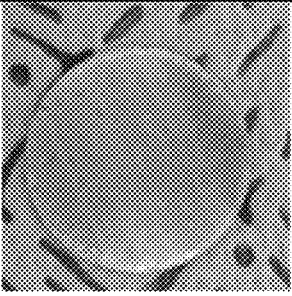 | 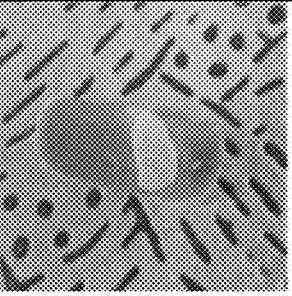 | 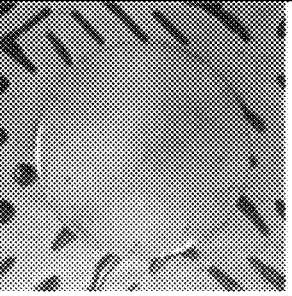 |
| IMAGE ON CHANGES OCCURRING AFTER DROPPING WATER DROPS ON SURFACE | 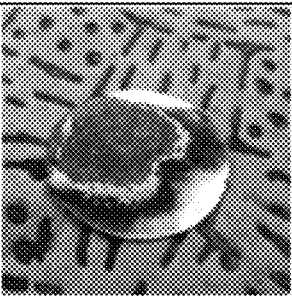 | | 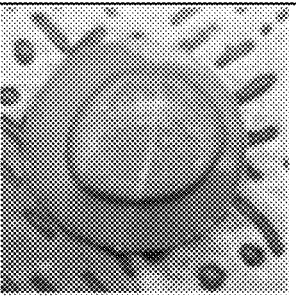 |

LITHIUM ELECTRODE, LITHIUM SECONDARY BATTERY COMPRISING SAME, BATTERY MODULE COMPRISING LITHIUM SECONDARY BATTERY, AND PREPARATION METHOD OF LITHIUM ELECTRODE

TECHNICAL FIELD

This application claims priority to and the benefits of Korean Patent Application No. 10-2014-0118493, filed with the Korean Intellectual Property Office on Sep. 5, 2014, the entire contents of which are incorporated herein by reference.

The present specification relates to a lithium electrode, a lithium secondary battery including the same, a battery module including the lithium secondary battery, and a method for preparing the lithium electrode.

BACKGROUND ART

With a recent trend of miniaturization and weight lightening of electronic devices, miniaturization and weight lightening of batteries used therein as a power supply have been also required. Lithium secondary batteries are commercialized as batteries that are small, light, and chargeable and dischargeable with high capacity, and used in portable electronic devices such as small video cameras, mobile phones and laptops, communication devices and the like.

Lithium secondary batteries are an energy storage system having high energy and power, and have excellent advantages of having higher capacity or operating voltage compared to other batteries. However, battery safety becomes a problem due to such high energy, and there is a risk of explosion or fire. Particularly, in hybrid vehicles and the like recently receiving an attention, high energy and output properties are required and accordingly, such safety is more important.

A lithium secondary battery is generally formed with a cathode, an anode and an electrolyte, and charge and discharge become possible since lithium ions perform a role of transferring energy while travelling back and forth between both electrodes such as lithium ions coming out of a cathode active material being inserted into an anode active material, that is, carbon particles, by first charge, and eliminated again during discharge.

Meanwhile, with the development of portable electronic devices, high capacity batteries have been continuously required, and researches on high capacity lithium anode materials having significantly higher capacity per unit weight compared to carbon used as an existing anode material have been actively conducted.

DISCLOSURE

Technical Problem

The present specification is directed to providing a lithium electrode, a lithium secondary battery including the same, a battery module including the lithium secondary battery, and a method for preparing a lithium electrode.

Technical Solution

One embodiment of the present specification provides a lithium electrode including a lithium metal layer having a hydroxyl group on a surface thereof; and a silicon layer provided on the lithium metal layer and including a silicon-based compound, wherein the silicon-based compound of the silicon layer forms covalent bonds with a hydroxyl group of a lower membrane that is in contact with the silicon layer.

Another embodiment of the present specification provides a lithium secondary battery including the lithium electrode.

Still another embodiment of the present specification provides a battery module including the lithium secondary battery as a unit battery.

Yet another embodiment of the present specification provides a method for preparing a lithium electrode including forming a silicon layer including a silicon-based compound on a lithium metal layer having a hydroxyl group on a surface thereof, wherein the silicon-based compound of the silicon layer forms covalent bonds to a hydroxyl group of a lower membrane that is in contact with the silicon layer.

Advantageous Effects

A lithium electrode according to one embodiment of the present specification has an advantage of having a long life.

A lithium electrode according to one embodiment of the present specification can be efficiently blocked from moisture.

A lithium electrode according to one embodiment of the present specification has low interfacial resistance and therefore, is capable of enhancing charge and discharge efficiency.

A lithium electrode according to one embodiment of the present specification has an advantage of having smooth lithium ion transfer by being blocked from moisture.

DESCRIPTION OF DRAWINGS

FIG. 1 is a structural diagram of a lithium electrode according to one embodiment of the present specification.

FIG. 2 is a structural diagram of a lithium electrode according to another embodiment of the present specification.

FIG. 3 is a diagram illustrating steps of preparing the lithium electrode of FIG. 2.

FIG. 4 is a graph evaluating a cycle life of a lithium electrode of Test Example 1.

FIG. 5 is a result showing moisture permeability of Test Example 2.

REFERENCE NUMERAL

100: Lithium Metal Layer
200: Silicon Layer
300: Buffer Layer
310: Lower Part of Buffer Layer
330: Upper Part of Buffer Layer

MODE FOR DISCLOSURE

Hereinafter, the present specification will be described in detail.

The present specification provides a lithium electrode including a lithium metal layer having a hydroxyl group on a surface thereof; and a silicon layer provided on the lithium metal layer and including a silicon-based compound, wherein the silicon-based compound of the silicon layer forms covalent bonds with a hydroxyl group of a lower membrane that is in contact with the silicon layer.

The lithium electrode may have a thickness of greater than or equal to 10 μm and less than or equal to 200 μm.

Preferably, the lithium electrode may have a thickness of greater than or equal to 10 μm and less than or equal to 100 μm.

In the present specification, the thickness of the lithium electrode means a total thickness including the lithium metal layer and the silicon layer. When the lithium electrode further includes additional layers in addition to the lithium metal layer and the silicon layer, the thickness of the lithium electrode means a total thickness of the whole lithium electrode with the thicknesses of the additional layers further included therein. For example, when the lithium electrode further includes a buffer layer to be described below, the thickness of the lithium electrode means a total thickness including the lithium metal layer, the silicon layer and the buffer layer.

In the present specification, the lithium electrode may be used in a battery, and the lithium electrode may be an electrode exporting electrons when the battery is discharged. Specifically, the lithium electrode may be used in a secondary battery, and the lithium electrode may export electrons based on when the battery is discharged, and may perform a role of a cathode (reduction electrode) when the battery is charged.

The lithium metal layer means a metal layer including a lithium metal element. Materials of the lithium metal layer may include lithium alloys, lithium metal, oxides of lithium alloys or lithium oxides. Herein, a part of the lithium metal layer may be degenerated due to oxygen or moisture, or may include impurities.

The lithium metal layer may have a thickness of greater than or equal to 10 μm and less than or equal to 200 μm. Preferably, the lithium metal layer may have a thickness of greater than or equal to 10 μm and less than or equal to 100 μm.

Based on the total thickness of the lithium electrode, a percentage of the thickness of the lithium metal layer may be from 90% to 99.99%. This has an advantage in that lithium ions smoothly migrate due to a very thin organic protective layer.

The lithium metal layer may have a hydroxyl group on the surface. The hydroxyl group on the surface of the lithium metal layer is a hydroxyl group produced from a reaction between lithium metal in the lithium metal layer and a small amount of moisture without a separate artificial process, or a hydroxyl group formed from surface modification through an additional artificial process.

The artificial process forming a hydroxyl group on the surface of the lithium metal layer is not particularly limited, and examples thereof may include a method of polishing with a film or sandpaper, a method of thinly oxidizing a surface of the lithium metal layer by adding a small amount of water into a solvent, and a method of polishing a surface of the lithium metal layer with methanol or n-alkane such as pentane, however, the method is not limited thereto.

The silicon layer is provided on the lithium metal layer and may include a silicon-based compound forming covalent bonds with a hydroxyl group of a lower membrane of the silicon layer.

The silicon layer is formed with a silicon-based compound having a reactive group capable of forming covalent bonds with a hydroxyl group, and when the lower membrane that is in direct contact with the silicon layer is a lithium metal layer, covalent bonds may be formed by the hydroxyl group of the lithium metal layer reacting with substituents capable of reacting with the hydroxyl group in the silicon-based compound on the surface that the silicon layer is in contact with the lithium metal layer.

The silicon-based compound may form covalent bonds by the hydroxyl group on the surface of the lithium metal layer reacting with reactive substituents of the silicon-based compound while being self-assembled on the lithium metal surface. Among the substituents of the silicon-based compound, substituents that do not react with the hydroxyl group on the surface of the lithium metal layer may form cross-linked bonds with neighboring silicon-based compounds.

The silicon layer may be provided on at least a part of the surface of the lithium metal layer, and specifically, the silicon layer may be provided on at least one side surface of the surface of the lithium metal layer, or the silicon layer may be provided on the whole surface of the lithium metal layer.

When the silicon layer is provided on at least a part of the surface of the lithium metal layer, formation of a solid electrolyte interphase (SEI) layer formed while the lithium metal layer and a liquid electrolyte react may be suppressed. In other words, interfacial resistance may be reduced since formation of a solid electrolyte interphase layer that induces resistance is suppressed.

When the silicon layer is provided on the whole surface of the lithium metal layer, a contact between the lithium metal layer and moisture may be blocked while suppressing the formation of a solid electrolyte interphase layer on the surface of the lithium metal layer.

When a buffer layer is provided between the lithium metal layer and the silicon layer, the silicon layer may include a silicon-based compound forming covalent bonds with a hydroxyl group of the buffer layer.

The silicon-based compound may be prepared with a compound represented by the following Chemical Formula 1.

[Chemical Formula 1]

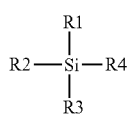

In Chemical Formula 1, one or more of R1 to R4 are each independently a halogen group, an amino group or an alkoxy group, and the rest are each independently a $C_1$ to $C_{10}$ alkyl group, a hydroxyl group, an aliphatic cyclic group having two rings or less, an aromatic cyclic group having two rings or less, or -L-$(CF_2)_n CF_3$, L is a direct bond or a $C_1$ to $C_{10}$ alkylene group, and n is an integer of 0 to 10.

A water contact angle of the silicon layer may be greater than or equal to 100° and less than or equal to 160°. This has an advantage in that moisture penetration into the silicon layer, a protective layer, may be prevented since the surface is extremely hydrophobic.

The silicon layer may have a thickness of greater than or equal to 1 nm and less than or equal to 1 μm. The silicon layer is famed from a self-assembly behavior of a silane-based compound, and therefore, may form a uniform and even hydrophobic surface on the lithium metal layer.

Specifically, the silicon layer may have a thickness of greater than or equal to 1 nm and less than or equal to 10 nm. The silicon layer is formed from a self-assembly behavior of a silane-based compound, and therefore, may form a uniform and even hydrophobic surface on the lithium metal layer, and has an advantage in that lithium ions readily migrate since the silicon layer is very thin.

In the present specification, the silicon layer may be foiled on the lithium metal layer by forming covalent bonds with a hydroxyl group on the surface of the lithium metal layer while molecules forming the silicon layer are arranged through self-assembly as shown in FIG. 1. The thickness of the silicon layer formed thereby may correspond to a length of one molecule forming the silicon layer.

The silicon layer is capable of performing a role of a relatively stably fixed protective layer despite its small thickness since it forms covalent bonds on the lithium metal layer.

Based on the total thickness of the lithium electrode, a percentage of the thickness of the silicon layer may be from 0.0001% to 10%. In this case, due to the silicon layer that is a thin organic protective layer, the lithium metal layer may be blocked from moisture while lithium ions smoothly migrate.

Specifically, based on the total thickness of the lithium electrode, a percentage of the thickness of the silicon layer may be from 0.0005% to 1% and more specifically from 0.0005% to 0.1%.

The buffer layer may be provided between the lithium metal layer and the silicon layer, and is a layer having a hydroxyl group on the surface.

The buffer layer may be prepared with a material having a hydroxyl group to have a hydroxyl group on the surface.

The buffer layer may be prepared with a material of which surface is readily modified so as to have a hydroxyl group through an additional process.

Materials of the buffer layer are not particularly limited as long as they have a hydroxyl group on the surface and capable of being coated on the lithium metal layer, and for example, the buffer layer may include a siloxane-based compound. This has an advantage in that the surface is readily modified to have a hydroxyl group and coating is favorably carried out on the surface of the lithium metal layer. In addition, the siloxane-based compound is expanded in an electrolyte making lithium ion migration possible.

Specifically, the buffer layer may include polydimethylsiloxane. This has an advantage in that the polydimethylsiloxane is expanded in an electrolyte making lithium ion migration smooth.

The hydroxyl group on the surface of the buffer layer may react with a reactive group of the silicon-based compound to form covalent bonds with the silicon layer.

The buffer layer may be provided on at least a part of the surface of the lithium metal layer, and specifically, the buffer layer may be provided on at least one side surface of the surface of the lithium metal layer, or the silicon layer may be provided on the whole surface of the lithium metal layer.

The buffer layer may be provided on 90% or higher of the whole surface area of the lithium metal layer, and specifically, the buffer layer is preferably provided on the whole surface of the lithium metal layer. This has an advantage in that the lithium metal layer is protected from moisture, and the silicon layer forming covalent bonds with a hydroxyl group on the surface of the protective layer is readily formed.

The buffer layer may have a thickness of greater than or equal to 10 nm and less than or equal to 10 μm. In this case, the buffer layer assists the role of a protective layer blocking moisture, and is expanded enabling the migration of lithium ions without inhibiting the lithium ion migration.

Preferably, the buffer layer may have a thickness of greater than or equal to 10 nm and less than or equal to 1 μm, and more preferably, the buffer layer may have a thickness of greater than or equal to 10 nm and less than or equal to 100 nm.

Based on the total thickness of the lithium electrode, a percentage of the thickness of the buffer layer may be from 0.001% to 10%. This may provide an environment for smooth lithium ion migration as well as providing an expansion phenomenon.

Specifically, based on the total thickness of the lithium electrode, a percentage of the thickness of the buffer layer may be from 0.005% to 5% and more specifically from 0.005% to 1%.

The present specification provides a lithium secondary battery including the lithium electrode. Specifically, the present specification provides a lithium secondary battery including the lithium electrode; a cathode, and an electrolyte provided between the lithium electrode and the cathode.

A shape of the lithium secondary battery is not limited, and examples thereof may include a coin-type, a plate-type, a cylinder-type, a horn-type, a button-type, a sheet-type or a layered-type.

The lithium secondary battery may be a lithium air battery. Specifically, the cathode of the lithium secondary battery may be an air electrode.

The lithium secondary battery may further include tanks each storing the cathode liquid electrolyte and the lithium electrode liquid electrolyte, and a pump transporting the each liquid electrolyte to an electrode cell, and may be manufactured to a flow battery.

The electrolyte may be an electrolyte liquid into which the lithium electrode and the cathode are immersed.

The lithium secondary battery may further include a separator provided between the lithium electrode and the cathode. The separator placed between the lithium electrode and the cathode separates or insulates the lithium electrode and the cathode, and any material may be used as long as it allows ion transport between the lithium electrode and the cathode. Examples thereof may include a non-conducting porous membrane or an insulating porous membrane. More specifically, polymer non-woven fabric such as non-woven fabric made of polypropylene materials or non-woven fabric made of polyphenylene sulfide materials; or porous films of olefin-based resins such as polyethylene or polypropylene may be included as examples, and these may be used as a combination of two or more types.

The lithium secondary battery may further include a cathode-side cathode liquid electrolyte and a lithium electrode-side lithium electrode liquid electrolyte divided by the separator. The cathode liquid electrolyte and the lithium electrode liquid electrolyte may each include a solvent and an electrolytic salt. The cathode liquid electrolyte and the lithium electrode liquid electrolyte may be the same as or different from each other.

The liquid electrolyte may be an aqueous liquid electrolyte or a non-aqueous liquid electrolyte. The aqueous liquid electrolyte may include water as a solvent, and the non-aqueous liquid electrolyte may include a non-aqueous solvent as a solvent.

The non-aqueous solvent is not particularly limited, and those generally used in the art may be selected, and for example, may be selected from the group consisting of carbonate-based solvents, ester-based solvents, ether-based solvents, ketone-based solvents, organosulfur-based solvents, organophosphorous-based solvents, nonprotonic solvents and combinations thereof.

The electrolytic salt refers to those dissociated into cations and anions in water or non-aqueous organic solvents, and is not particularly limited as long as it is capable of transferring lithium ions in a lithium secondary battery, and those generally used in the art may be selected.

In the liquid electrolyte, the electrolytic salt may have a concentration of greater than or equal to 0.1 M and less than or equal to 3 M. In this case, charge and discharge properties of a lithium secondary battery may be effectively exhibited.

The electrolyte may be a solid electrolyte membrane or a polymer electrolyte membrane.

Materials of the solid electrolyte membrane and the polymer electrolyte membrane are not particularly limited, and those generally used in the art may be employed. For example, the solid electrolyte membrane may include composite metal oxides, and the polymer electrolyte membrane may be a membrane having a conducting polymer provided inside a porous substrate.

The cathode means an electrode accepting electrons and reducing lithium-containing ions when a battery is discharged in a lithium secondary battery. On the contrary, the cathode performs a role of a lithium electrode (oxidation electrode) exporting electrons and losing lithium-containing ions with an oxidation of a cathode active material when a battery is charged.

The cathode may include a cathode collector and a cathode active material layer formed on the cathode collector.

In the present specification, materials of the cathode active material of the cathode active material layer are not particularly limited as long as lithium-containing ions are reduced when the battery is discharged and oxidized when charged when the cathode active material is used in a lithium secondary battery with the lithium electrode. For example, the material may be transition metal oxides or composites based on sulfur (S), and specifically, may include at least one of $LiCoO_2$, $LiNiO_2$, $LiFePO_4$, $LiMn_2O_4$, $LiNi_xCo_yMn_zO_2$ (herein, x+y+z=1), $Li_2FeSiO_4$, $Li_2FePO_4F$, and $Li_2MnO_3$.

In addition, when the cathode is a composite based on sulfur (S), the lithium secondary battery may be a lithium sulfur battery. The composite based on sulfur (S) is not particularly limited, and cathode materials generally used in the art may be selected and used.

The present specification provides a battery module including the lithium secondary battery as a unit battery.

The battery module may be formed by stacking with bipolar plates provided between the two or more lithium secondary batteries according to one embodiment of the present specification.

When the lithium secondary battery is a lithium air battery, the bipolar plate may be porous so as to supply air supplied from the outside to a cathode included in each lithium air battery. Examples thereof may include porous stainless steel or porous ceramic.

Specifically, the battery module may be used as a power supply of electric vehicles, hybrid electric vehicles, plug-in hybrid electric vehicles or power storage systems.

The present specification provides a method for preparing a lithium electrode including forming a silicon layer including a silicon-based compound on a lithium metal layer having a hydroxyl group on a surface thereof, wherein the silicon-based compound of the silicon layer forms covalent bonds with a hydroxyl group of a lower membrane that is in contact with the silicon layer.

The forming of a silicon layer may include preparing a solution including a silicon-based compound having a substituent capable of reacting with a hydroxyl group; and coating the solution on at least a part of the surface of the lithium metal layer.

The forming of a silicon layer may include preparing a solution including a silicon-based compound having a substituent capable of reacting with a hydroxyl group; and immersing the lithium metal layer into the solution.

Based on FIG. 1, a silicon layer 200 may be formed by coating a silicon-based compound ($R_3SiCl$) having a chloride group, a substituent capable of reacting with a hydroxyl group, on a lithium metal layer 100 having a hydroxyl group. The silicon-based compound is arranged while being self-assembled on the surface of the lithium metal layer, and the lithium metal layer and the silicon layer may form covalent bonds as the hydroxyl group on the surface of the lithium metal layer and the chloride group of the silicon-based compound react and produce hydrochloric acid (HCl). In the $R_3SiCl$, Rs are each independently a halogen group, an amino group, an alkoxy group, a $C_1$ to $C_{10}$ alkyl group, a hydroxyl group, an aliphatic cyclic group having two rings or less, an aromatic cyclic group having two rings or less, or -L-$(CF_2)_nCF_3$, L is a direct bond or a $C_1$ to $C_{10}$ alkylene group, and n is an integer of 0 to 10.

The silicon-based compound having a substituent capable of reacting with a hydroxyl group may be represented by the following Chemical Formula 1.

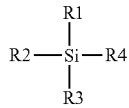

[Chemical Formula 1]

In Chemical Formula 1, one or more of R1 to R4 are each independently a halogen group, an amino group or an alkoxy group, the rest are each independently a $C_1$ to $C_{10}$ alkyl group, a hydroxyl group, an aliphatic cyclic group having two rings or less, an aromatic cyclic group having two rings or less, or -L-$(CF_2)_nCF_3$, L is a direct bond or a $C_1$ to $C_{10}$ alkylene group, and n is an integer of 0 to 10.

In Chemical Formula 1, one or more of R1 to R3 are each independently a halogen group, an amino group or an alkoxy group, and the rest are each independently a $C_1$ to $C_{10}$ alkyl group, a hydroxyl group, an aliphatic cyclic group having two rings or less, an aromatic cyclic group having two rings or less, or -L-$(CF_2)_nCF_3$, R4 is a $C_1$ to $C_{10}$ alkyl group, a hydroxyl group, an aliphatic cyclic group having two rings or less, an aromatic cyclic group having two rings or less, or -L-$(CF_2)_nCF_3$, L is a direct bond or a $C_1$ to $C_{10}$ alkylene group, and n is an integer of 0 to 10.

In Chemical Formula 1, R1 may be a halogen group, an amino group or an alkoxy group.

In Chemical Formula 1, R2 and R3 are each independently a halogen group, a hydroxyl group or an alkoxy group.

In Chemical Formula 1, R4 is a $C_1$ to $C_{10}$ alkyl group, an aliphatic cyclic group having two rings or less, an aromatic cyclic group having two rings or less, or -L-$(CF_2)_nCF_3$, L is a direct bond or a $C_1$ to $C_{10}$ alkylene group, and n is an integer of 0 to 10.

In Chemical Formula 1, R1 is a halogen group, an amino group or an alkoxy group, R2 and R3 are each independently a halogen group, a hydroxyl group or an alkoxy group, R4 is a $C_1$ to $C_{10}$ alkyl group, an aliphatic cyclic group having two rings or less, an aromatic cyclic group having two rings or less, or -L-$(CF_2)_nCF_3$, L is a direct bond or a $C_1$ to $C_{10}$ alkylene group, and n is an integer of 0 to 10.

In Chemical Formula 1, at least one of R1 to R3 may be a halogen group. Specifically, at least one of R1 to R3 may be a chloride group.

In Chemical Formula 1, at least one of the remaining substituents among R1 to R3, and R4 may be a $C_1$ to $C_{10}$ alkyl group or -L-$(CF_2)_nCF_3$, and herein, L is a direct bond or a $C_1$ to $C_{10}$ alkylene group, and n is an integer of 0 to 10. In this case, hydrophobicity on the surface of the silicon layer increases and the lithium metal layer may be readily blocked from moisture.

In Chemical Formula 1, at least one of R1 to R3 is a halogen group, and the remaining substituents among R1 to R3, and R4 are each independently a $C_1$ to $C_{10}$ alkyl group or -L-$(CF_2)_nCF_3$, and herein, L is a direct bond or a $C_1$ to $C_{10}$ alkylene group, and n is an integer of 0 to 10.

The silicon-based compound having a substituent capable of reacting with a hydroxyl group may be represented by at least one of the following Chemical Formulae 2 to 4.

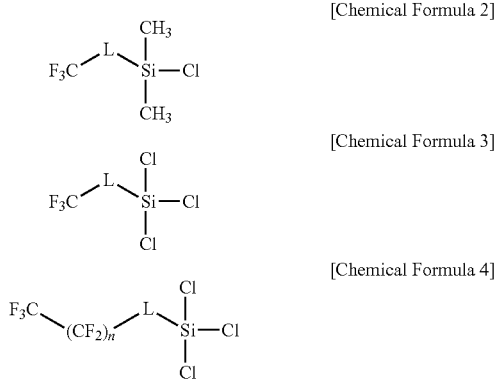

In Chemical Formulae 2 to 4,

L is a direct bond or a $C_1$ to $C_{10}$ alkylene group, and n is an integer of 0 to 10.

In Chemical Formula 2, L may be an ethylene group.

In Chemical Formula 3, L may be an ethylene group.

In Chemical Formula 4, n is 5, and L may be an ethylene group.

In the present specification, examples of the halogen group may include fluorine, chlorine, bromine or iodine.

In the present specification, the alkyl group may be linear or branched, and the number of carbon atoms is not particularly limited, but is preferably from 1 to 10. Specific examples thereof may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl or the like, but are not limited thereto.

In the present specification, the aliphatic cyclic group is not particularly limited, but preferably has 3 to 60 carbon atoms, and specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclhexyl, 2,3-dimethylcyclohexyl, 3,4,5-trimethylcyclohexyl, 4-tert-butylcyclohexyl, cycloheptyl, cyclooctyl, adamantly or the like, but are not limited thereto.

In the present specification, the aromatic cyclic group may include a heterocyclic group and a non-heterocyclic group.

The heterocyclic group may be a heterocyclic group having 2 to 60 carbon atoms including one or more of O, N and S as a heteroatom, and may include a monocyclic heterocyclic group or a multicyclic heterocyclic group. Examples of the heterocyclic group may include a thiophene group, a furan group, a pyrrole group, an imidazole group, a thiazole group, an oxazole group, an oxadiazole group, a triazole group, a pyridyl group, a bipyridyl group, a pyrimidyl group, a triazine group, a triazole group, an acridyl group, a pyridazine group, a pyrazinyl group, a qinolinyl group, a quinazoline group, a quinoxalinyl group, a phthalazinyl group, a pyridopyrimidinyl group, a pyridopyrazinyl group, a pyrazinopyrazinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, a phenanthroline group, a thiazolyl group, an isoxazolyl group, an oxadiazolyl group, a thiadiazolyl group, a benzothiazolyl group, a phenothiazinyl group, a dibenzofuranyl group or the like, but are not limited thereto.

The non-heterocyclic group means an aromatic cyclic group formed with carbon and hydrogen, and may be a monocyclic aryl group or a multicyclic aryl group.

When the non-heterocyclic group is a monocyclic aryl group, the number of carbon atoms is not particularly limited, but is preferably from 6 to 25. Specific examples of the monocyclic aryl group may include a phenyl group, a biphenyl group, a terphenyl group or the like, but are not limited thereto.

When the non-heterocyclic group is a multicyclic aryl group, the number of carbon atoms is not particularly limited, but is preferably from 10 to 24. Specific examples of the multicyclic aryl group may include a naphthyl group, an anthracenyl group, a phenanthryl group, a pyrenyl group, a perylenyl group, a crycenyl group, a fluorenyl group or the like, but are not limited thereto.

In the present specification, the amine group may include an alkylamine group, an arylamine group, a diarylamine group, a dialkylamine group and an alkylarylamine group. The number of carbon atoms is not particularly limited, but is preferably from 1 to 30. Specific examples of the amine group may include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a phenylnaphthylamine group, a ditolylamine group, a phenyltolylamine group, a triphenylamine group or the like, but are not limited thereto.

In the present specification, the alkoxy group is —OR, and R is an alkyl group. Herein, the alkyl group may cite the descriptions provided above.

The silicon-based compound having a substituent capable of reacting with a hydroxyl group may be any one of the following compounds.

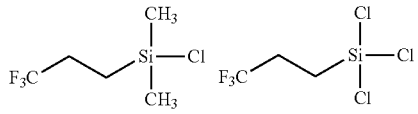

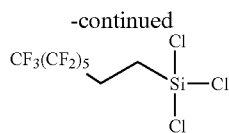

The method for preparing a lithium electrode may include forming a buffer layer having a hydroxyl group on the surface of the lithium metal layer; and forming a silicon layer including a silicon-based compound forming covalent bonds with the hydroxyl group on the buffer layer.

Based on FIG. 2, a buffer layer 300 having a hydroxyl group on the surface is formed on a lithium metal layer 100, and a silicon layer 200 may be formed by coating a silicon-based compound ($R_3SiCl$) having a chloride group, a substituent capable of reacting with a hydroxyl group, on the buffer layer 300. The silicon-based compound is arranged while being self-assembled on the surface of the buffer layer, and the buffer layer and the silicon layer may form covalent bonds as the hydroxyl group on the surface of the buffer layer and the chloride group of the silicon-based compound react and produce hydrochloric acid (HCl). In the $R_3SiCl$, Rs are each independently a halogen group, an amino group, an alkoxy group, a $C_1$ to $C_{10}$ alkyl group, a hydroxyl group, an aliphatic cyclic group having two rings or less, an aromatic cyclic group having two rings or less, or -L-$(CF_2)_nCF_3$, L is a direct bond or a $C_1$ to $C_{10}$ alkylene group, and n is an integer of 0 to 10.

The forming of a buffer layer may include forming a buffer layer on the lithium metal layer; and introducing a hydroxyl group on a surface of the buffer layer by oxygen plasma treating or ultraviolet/ozone treating the buffer layer.

Based on FIG. 3, a buffer layer 300 is famed on a lithium metal layer 100, and by oxygen plasma treating or ultraviolet/ozone treating a surface of the buffer layer, a hydroxyl group may be introduced to the surface of the buffer layer. Herein, an upper part 330 of the oxygen plasma treated or ultraviolet/ozone treated buffer layer is modified to a layer formed with silicon oxide (SiOx, herein, x is an oxidation number.), and the upper part 330 of the buffer layer may have a hydroxyl group on the surface. In addition, in the buffer layer 300, a lower part 310 of the buffer layer that is not oxygen plasma treated or ultraviolet/ozone treated is not modified, and its original material may be maintained.

The forming of a buffer layer may include forming a buffer layer on a release substrate; and laminating the buffer layer on the lithium metal layer.

The method for preparing a lithium electrode may include forming a buffer layer having a hydroxyl group on a surface of a release substrate; forming a silicon layer including a silicon-based compound forming covalent bonds with the hydroxyl group on the buffer layer; and removing the release substrate and laminating the result on the lithium metal layer.

The forming of a buffer layer may include forming a buffer layer on a surface of a release substrate; and introducing a hydroxyl group on a surface of the buffer layer by oxygen plasma treating or ultraviolet/ozone treating the buffer layer.

In the method for preparing a lithium electrode, descriptions on the lithium metal layer, the silicon layer, the buffer layer and the like may use the descriptions provided above.

A composition for a buffer layer for forming the buffer layer may include a PDMS precursor and a curing agent, and herein, the curing agent may be added in a ratio of 10:1 to 10:5 with respect to the PDMS precursor. As the amount of the curing agent increases, curing time decreases. A curing temperature after applying the composition for a buffer layer is from 50° C. to 100° C., and as the curing temperature increases, curing time decreases.

Hereinafter, the present specification will be described in more detail with reference to examples. However, the following examples are for illustrative purposes only, and the present specification is not limited thereto.

EXAMPLE

Example 1

A lithium electrode layer was prepared with lithium foil each having a thickness of 20 µm, 40 µm and 150 µm or by further attaching copper foil to lithium foil each having a thickness of 20 µm, 40 µm and 150 µm. The lithium electrode layer was immersed in an anhydrous alkane-based solvent for 1 hour, taken out, and vacuum dried for 30 minutes.

The dried lithium electrode layer was immersed in a trichloro(1H,1H,2H,2H-perfluorooctyl)silane/toluene solution (1 wt %) for 1 hour, taken out, and washed with an anhydrous alkane solvent. Herein, immersing in an approximately 2 mL of solution per $cm^2$ area unit of the lithium electrode layer is common.

The result obtained as above may be used as a trichloro (1H,1H,2H,2H-perfluorooctyl)silane-coated lithium electrode. As a structure of a battery, various shapes such as a coin cell and a pouch cell may be used.

Example 2

A lithium electrode layer was prepared with lithium foil each having a thickness of 20 µm, 40 µm and 150 µm or by further attaching copper foil to lithium foil each having a thickness of 20 µm, 40 µm and 150 µm.

As a buffer layer on the lithium electrode layer, polydimethylsiloxane (PDMS) was used. A PDMS precursor and a curing agent were added to a solvent in a weight ratio of 10:1 to prepare a composition, and the composition was coated on the electrode foil using drop-casting or spin-coating to form a PDMS layer, and an electrode was prepared. The electrode was heat treated for 2 hours at 80° C. to cure the PDMS layer. The cured PDMS was UV ozone treated or oxygen plasma treated to form a polar hydroxyl group on the PDMS surface (produced SiOx phase).

After that, the treated electrode foil was immersed in a trichloro(1H,1H,2H,2H-perfluorooctyl)silane/toluene solution (1 wt %) for 1 hour, taken out, and washed with an anhydrous alkane solvent. Herein, immersing in an approximately 2 mL of solution per $cm^2$ area unit of the foil is common.

The result obtained as above may be used as a trichloro (1H,1H,2H,2H-perfluorooctyl)silane-coated lithium electrode. As a structure of a battery, various shapes such as a coin cell and a pouch cell may be used.

Comparative Example 1

Lithium foil or lithium/copper foil without forming a silicon layer in Example 1 was used as Comparative Example 1.

Test Example 1

Life of Lithium Electrode

Cycle life of the lithium electrodes of Examples 1 and 2 and Comparative Example 1 was evaluated. Specifically, Li/Li symmetric cell was prepared and measured with reference to an Aurbach method, and the results are shown in FIG. 4.

Liquid electrolyte composition: 1 M $LiPF_6$ in EC:EMC (1:1 v/v)

Test Example 2

Moisture Permeability

States after exposing Examples 1 and 2 and Comparative Example 1 to air (RH 50%) for 10 minutes and states after dropping water drops on Examples 1 and 2 and Comparative Example 1 were compared, and each image is shown in FIG. 5.

As shown in FIG. 5, LiCl having a very strong moisture absorbing property was produced as a byproduct in Example 1 leading to a result exhibiting a declined moisture blocking property compared to Comparative Example 1. Meanwhile, Example 2 exhibited an improved moisture blocking property compared to Comparative Example 1.

Test Example 3

Water Contact Angle

Results or measuring water contact angles of Examples 1 and 2 and Comparative Example 1 are shown in the following Table 1.

TABLE 1

| | Water Contact Angle (°) |
|---|---|
| Comparative Example 1 | Impossible to Measure (Reacted with Water) |
| Example 1 | Impossible to Measure (Reacted with Water) |
| PDMS/Li, intermediate of Example 2 | 110 |
| Example 2 | 130 to 150 |

The invention claimed is:

1. A lithium electrode comprising:
a lithium metal layer; and
a silicon layer
    wherein the silicon layer is bonded to the lithium metal layer through a reaction of a silicon-based compound with hydroxyl groups on the lithium metal layer,
    wherein the silicon-based compound is one or more selected from the group consisting of:

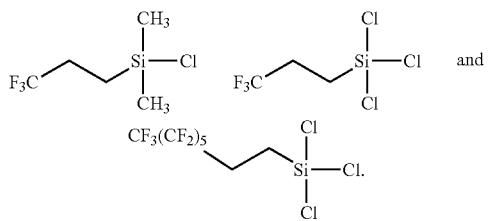

2. The lithium electrode of claim 1, wherein a water contact angle of the silicon layer is 100° or more and 160° or less.

3. The lithium electrode of claim 1, wherein a thickness of the silicon layer is 1 nm or more and 1 μm or less.

4. A lithium secondary battery comprising the lithium electrode of claim 1.

5. The lithium secondary battery of claim 4, wherein the lithium electrode is a lithium electrode of the lithium secondary battery, the battery comprising:
a cathode;
an electrolyte provided between the lithium electrode and the cathode; and
a separator provided between the lithium electrode and the cathode,
wherein the electrolyte is an electrolyte liquid into which the lithium electrode and the cathode are immersed.

6. A battery module comprising the lithium secondary battery of claim 4 as a unit battery.

7. A lithium electrode comprising:
a lithium metal layer;
a silicon layer; and
a buffer layer provided between the lithium metal layer and the silicon layer,
    wherein the buffer layer is bonded to the lithium metal layer through a reaction with hydroxyl groups on the lithium metal layer,
    wherein the silicon layer is bonded to the buffer layer through a reaction of a silicon-based compound with hydroxyl groups on the buffer layer,
    wherein the silicon-based compound is prepared with a compound represented by the following Chemical Formula 1:

[Chemical Formula 1]

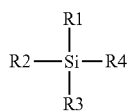

wherein, in Chemical Formula 1,
one or more of R1 to R4 are each independently a halogen group, an amino group or an alkoxy group, and the rest are each independently a $C_1$ to $C_{10}$ alkyl group, a hydroxyl group, an aliphatic cyclic group having two rings or less, an aromatic cyclic group having two rings or less, or -L-$(CF_2)_n CF_3$, L is a direct bond or a $C_1$ to $C_{10}$ alkylene group, and n is an integer of 0 to 10.

8. The lithium electrode of claim 7, wherein the silicon-based compound is prepared with a compound represented by at least one of the following Chemical Formulae 2 to 4:

[Chemical Formula 2]

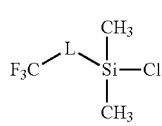

[Chemical Formula 3]

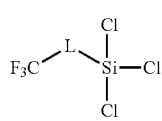

[Chemical Formula 4]

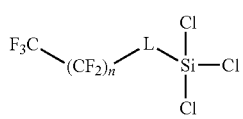

wherein, in Chemical Formulae 2 to 4,
L is a direct bond or a $C_1$ to $C_{10}$ alkylene group, and n is an integer of 0 to 10.

9. The lithium electrode of claim 7, wherein a water contact angle of the silicon layer is 100° or more and 160° or less.

10. The lithium electrode of claim 7, wherein a thickness of the silicon layer is 1 nm or more and 1 μm or less.

11. The lithium electrode of claim 7, wherein the buffer layer includes polydimethylsiloxane.

12. The lithium electrode of claim 7, wherein a thickness of the buffer layer is 10 nm or more and 10 μm or less.

13. A lithium secondary battery comprising the lithium electrode of claim 7.

14. The lithium secondary battery of claim 13, wherein the lithium electrode is a lithium electrode of the lithium secondary battery, the battery comprising:
a cathode;
an electrolyte provided between the lithium electrode and the cathode; and
a separator provided between the lithium electrode and the cathode,
wherein the electrolyte is an electrolyte liquid into which the lithium electrode and the cathode are immersed.

15. A battery module comprising the lithium secondary battery of claim 13 as a unit battery.

16. A method for preparing a lithium electrode comprising
forming a buffer layer having hydroxyl groups on a surface of a release substrate;
forming a silicon layer including reacting a silicon-based compound with the hydroxyl groups on the buffer layer to bond the silicon layer with the buffer layer; and
removing the release substrate and laminating the result on a lithium metal layer,
wherein the buffer layer is bonded to the lithium metal layer through a reaction with hydroxyl groups on the lithium metal layer,
wherein the silicon-based compounds are prepared with a compound represented by the following Chemical Formula 1:

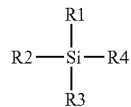

[Chemical Formula 1]

wherein, in Chemical Formula 1,
one or more of R1 to R4 are each independently a halogen group, an amino group or an alkoxy group, and the rest are each independently a $C_1$ to $C_{10}$ alkyl group, a hydroxyl group, an aliphatic cyclic group having two rings or less, an aromatic cyclic group having two rings or less, or -L-$(CF_2)_n CF_3$, L is a direct bond or a $C_1$ to $C_{10}$ alkylene group, and n is an integer of 0 to 10.

17. The method for preparing a lithium electrode of claim 16, wherein the silicon-based compound having a substituent capable of reacting with a hydroxyl group is represented by at least one of the following Chemical Formulae 2 to 4:

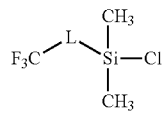

[Chemical Formula 2]

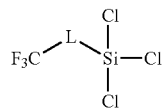

[Chemical Formula 3]

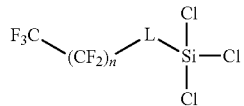

[Chemical Formula 4]

wherein, in Chemical Formulae 2 to 4,
L is a direct bond or a $C_1$ to $C_{10}$ alkylene group, and n is an integer of 0 to 10.

* * * * *